United States Patent [19]

Das et al.

[11] Patent Number: 5,612,404

[45] Date of Patent: Mar. 18, 1997

[54] AQUEOUS, ANIONIC, AMINO ACRYLATE COATING COMPOSITIONS

[75] Inventors: Suryya K. Das, Fox Chapel Boro.; Soner Kilic, Hampton Township, Allegheny County; Robert E. Jennings, New Sewickley Township, Beaver County; James A. Claar, Washington Township, Westmoreland County, all of Pa.

[73] Assignee: PPG Industries, Inc., Pittsburgh, Pa.

[21] Appl. No.: 576,534

[22] Filed: Dec. 21, 1995

[51] Int. Cl.$^6$ ............... C08J 3/00; C08K 3/20; C08L 75/00; C08F 8/30

[52] U.S. Cl. ............ 524/507; 524/589; 524/839; 524/840; 524/906; 525/123; 525/455

[58] Field of Search ............... 524/507, 839, 524/840, 589, 906; 525/123, 455

[56] References Cited

U.S. PATENT DOCUMENTS

| | | | |
|---|---|---|---|
| 4,659,781 | 4/1987 | Okude et al. | 525/279 |
| 5,075,370 | 12/1991 | Kubitza et al. | 524/591 |
| 5,225,505 | 7/1993 | Wiegert | 526/245 |
| 5,367,017 | 11/1994 | Rosthauser et al. | 524/589 |

*Primary Examiner*—Paul R. Michl
*Assistant Examiner*—Patrick Niland
*Attorney, Agent, or Firm*—Dennis G. Millman

[57] ABSTRACT

Disclosed are aqueous, single-package or two-package coating compositions having pH above 7.0 that contain as the binder a polyurea which is the product of a polyisocyanate and an anionic amino polymer synthesized in water from olefinically unsaturated monomers including primary or secondary amine containing monomers, the monomers being substantially free of acid groups. The polymerization of the amino polymer is carried out in the presence of an azo initiator dispersed in water by neutralization of acid groups present on the initiator.

15 Claims, No Drawings

AQUEOUS, ANIONIC, AMINO ACRYLATE COATING COMPOSITIONS

BACKGROUND OF THE INVENTION

This invention relates to aqueous coating compositions based on amino acrylate polymers.

It is generally desirable to use water based coatings instead of organic solvent based coatings for the sake of environmental considerations. However, the use of water instead of organic solvents in coating compositions based on polyisocyanates containing free isocyanate groups has been hampered by the fact that isocyanate groups react not only with isocyanate-reactive groups in the intended crosslinking reaction, but also with the water. Therefore, in a composition including a polyisocyanate, isocyanate-reactive groups, and water, the isocyanate/water reaction takes place with formation of urea and carbon dioxide. This reaction not only fails to achieve the intended crosslinking of the isocyanate reactive groups, but also results in gassing or foaming of the composition due to the formation of carbon dioxide. Various attempts have been made in the prior art to stabilize aqueous isocyanate compositions against the undesired side reaction with water.

In U.S. Pat. No. 5,225,505 there are disclosed amino acrylate polymers produced by emulsion polymerization in water. This patent teaches that it is necessary to include acrylic acid as one of the monomers for the polymerization. The polymeric products of the procedure disclosed in that patent have been found to be unsuitable for use in coating compositions. The deficiencies are demonstrated in a replicated example set forth herein.

It was disclosed in U.S. Pat. No. 5,075,370 that it is possible to produce aqueous, two-component polyurethane coating compositions by using neutralized, acid group-containing polyhydroxy polymers, i.e. polyhydroxypolyacrylates, as dispersing agents for polyisocyanates containing free isocyanate groups. The polyisocyanates containing free isocyanate groups are emulsified in the aqueous, anionic polymer solution or dispersion. The coating compositions according to that patent are said to have a pot life of several hours and cure by way of isocyanate/hydroxyl group reaction to form polyurethane linkages.

In commonly owned, copending U.S. patent application Ser. No. 08/357,488 filed Dec. 16, 1994, there is disclosed and claimed two-component waterborne coating compositions based on cationic amino acrylate dispersions and isocyanates that are relatively free from side reactions with water and which react to form polyureas. The amino acrylate polymers are dispersed into water by neutralization with an acid, with the result that the coating compositions have pH below 7.0. These compositions are satisfactory for use on metals if applied over a previously applied primer coating. For use in direct contact with a metal substrate, however, coatings having pH below 7.0 have the drawback of promoting corrosion of the substrate. It would be desirable to have coatings of the type disclosed in the aforesaid patent application that have pit greater than 7.0, thereby rendering them useful for direct application onto metal substrates.

SUMMARY OF THE INVENTION

The present invention is directed to aqueous coming compositions having pH higher than 7.0 that contain as the primary binder component polyureas that result from admixture of aqueous, anionic amino polymers and polyisocyanates.

The anionic amino polymers are the polymerization products of olefinically unsaturated compounds, including compounds containing primary amine groups and/or secondary amine groups. Optionally, other isocyanate-reactive groups, such as hydroxyl groups, may additionally be present in the monomers from which the amino polymer is synthesized. Preferably, the amino polymer is an amino acrylate.

The amino polymers of the present invention are polymerized in water in the presence of an emulsifier. Neutralization of amine groups with acid is not involved. Accordingly, the dispersed polymer product has pH greater than 7.0. Furthermore, the amino polymers of the present invention do not require acrylic acid to be included among the copolymerization monomers; preferably there is no deliberate addition of acid group containing monomers. As a result, a substantially cleaner polymerization has been found to be attainable.

Important to the ability to synthesize the amino polymers of the present invention in water is the use of azo type initiators having carboxy functionality to initiate free radical polymerization of the monomers that constitute the amino polymers. The carboxy functionality of the initiator is neutralized with a base to render the initiator soluble in water.

The polyisocyanate component contains polyisocyanate groups in amounts sufficient to provide an NCO/NH equivalent ratio of 0.5:1 to 5:1 in two package embodiments, and 0.5:1 to 1:1 in single package embodiments. If the amino polymer also includes hydroxyl groups as is optionally permitted, these ratios relate to the NCO/(NH+OH) equivalent ratio.

The polyisocyanate component is emulsified in the aqueous amino polymer component, optionally with the aid of a surfactant, thereby initiating crosslinking through urea linkages. The composition may be provided in two separate packages, in which case the amino polymer and isocyanate are combined only immediately prior to use. However, but it was surprisingly found that in some embodiments the coating can be supplied in a single package without bulk gelation. Whether in single package or two package form, the compositions of the present invention dry or cure, respectively, very rapidly. The rapid cure or dry rate and high pH render the coating compositions advantageous for use, for example, as primers for direct application onto metal.

DETAILED DESCRIPTION

The amino polymers contained in the coatings of the present invention are synthesized by a novel method described herein and which forms the subject matter of commonly owned U.S. patent application Ser. No. 08/577, 566 titled "Synthesis of Aqueous, Anionic, Amino Acrylate Polymers" filed on even date herewith by Suryya Das and Soner Kilic. The amino polymer is formed from olefinically unsaturated monomers containing primary and/or secondary amino groups. These amino groups serve as curing sites for reaction with the polyisocyanate to form urea linkages. Optionally, the amino polymers may also include hydroxyl groups, which upon curing with the isocyanate groups form urethane linkages. The amino group-containing polymers have a number average molecular weight ($M_n$), as determined by gel permeation chromatography, of about 500 to 50,000, preferably about 1,000 to 10,000. The amine content of the amino polymer is preferably 0.05 to 2.70 milliequivalents per gram, most preferably 0.25 to 1.62 milliequivalents per gram. The amino polymer component of the coating compositions of the present invention are provided in an aqueous medium in amounts of 20 to 65 percent by weight resin solids, preferably 35 to 50 percent by weight, and has a pH value of 7.0 to 10, preferably 7.5 to 9.5

In principle, suitable amino comonomers are any olefinically unsaturated, polymerizable compounds which contain at least one primary or secondary amino group, e.g.: amino acrylates and amino methacrylates such as tert-butylaminoethyl methacrylate or meta-isopropenyl-α,α-dimethylbenzylamine. Amino groups can also be obtained by the reaction of acid polymers with aziridines such as ethylene imine, or by the reaction of epoxy and blocked ketimines, as well as other techniques known for adding amine functionality to polymers.

Monomers containing hydroxyl groups are not required in the present invention, but when used, may be included in the monomer mixture in such quantities that the hydroxyl group-containing monomers are used in quantities of about 0 to 30 percent by weight, preferably 0 to 10 percent by weight based on the total weight of monomers used to copolymerize the amino polymer. Suitable monomers containing hydroxyl groups include, in particular, hydroxyalkyl esters of acrylic acid or methacrylic acid preferably containing 2 to 4 carbon atoms in the alkyl radical such as 2-hydroxyethyl acrylate or methacrylate, 2- or 3-hydroxypropyl acrylate or methacrylate, the isomeric hydroxybutyl acrylates or methacrylates and mixtures of such monomers.

The third group of olefinically unsaturated monomers which may be used for the production of the amino polymers are olefinically unsaturated compounds which contain neither amino nor hydroxyl groups. These compounds include esters of acrylic acid or methacrylic acid containing from 1 to 18, preferably from 1 to 8, carbon atoms in the alcohol radical, such as methyl acrylate, ethyl acrylate, isopropyl acrylate, n-propyl acrylate, n-butyl acrylate, 2-ethylhexyl acrylate, n-stearyl acrylate, and tertiary amine containing acrylates or methacrylates, and the methacrylates corresponding to these acrylates. Also included are styrene, alkyl substituted styrenes, acrylonitrile, methacrylonitrile, vinyl acetate, vinyl stearate and mixtures of such monomers. The monomers of this third group are used in quantities of 50 to 90 percent by weight, preferably about 40 to 80 percent by weight, based on the total weight of the monomers used.

The amino polymers are produced in water in the presence of an emulsifier. Details of such a polymerization process are well known to those of skill in the art. A novel feature of the polymerization is the selection of initiators. The polymerization reaction is free radically initiated when the monomer mixture is added together with an initiator mixture over a period of about 1 to 10 hours, preferably about 3 to 6 hours, at reaction temperature. Thereafter, more initiator may optionally be added to take the polymerization to a conversion of at least 99 percent.

Emulsifiers suitable for use in the polymerization include anionic, nonionic, and amphoteric (if non-ionic) emulsifiers. Many such emulsifiers are commercially available, several of which are disclosed in the examples herein.

The choice of the initiator compound used in the polymerization is important in the present invention. To attain the results of the present invention, azo type initiators which have carboxy groups are used. An initiator of this type is 4,4'-azobis(4-cyanovaleric acid), commercially available as "V-501" initiator from Wako Chemicals USA, Inc. The initiators are used in quantities of about 0.05 to 10 percent by weight, based on the total quantity of monomers. In general, the polymerization reaction takes place at temperatures in the range previously set forth, preferably at a temperature of about 50° to 100° C. under atmospheric pressure. The exact polymerization temperature is determined by the initiator used.

The molecular weight of the polymers may be regulated by standard regulators such as n-dodecylmercaptan, diisopropyl xanthogene disulfide, di-(methylene-trimethylolpropane)-xanthogene disulfide and thioglycol. They may be added in quantities up to about 10 percent by weight, based on the monomer mixture.

The polyisocyanate component (b) may be any polyisocyanate containing aliphatically, cycloaliphatically, araliphatically and/or aromatically bound isocyanate groups which are liquid at room temperature. The polyisocyanate component is preferably not modified to be water dispersible or soluble, although it may be so modified in a less preferred embodiment. The polyisocyanate component (b) is preferably a polyisocyanate or polyisocyanate mixture exclusively containing aliphatically and/or cycloaliphatically bound isocyanate groups and having an average NCO functionality of about 2.0 to 5.0.

If necessary, the polyisocyanates may be used in admixture with small quantities of inert solvents to reduce the viscosity. However, the maximum quantity in which such a solvent is used is such that the coating compositions contain at most 20 percent by weight of solvent, based on the quantity of water and any solvent that may still present in the polymer dispersions. Suitable solvents for the polyisocyanates include aromatic hydrocarbons such as solvent naphtha, acetates, or the solvents set forth as suitable for the polymerization of component (a).

Suitable polyisocyanates include those containing aromatically or (cyclo)aliphatically bound isocyanate groups, (cyclo)aliphatic polyisocyanates being particularly preferred. Particularly suitable are polyisocyanates based on 1,6-hexamethylene diisocyanate, 1-isocyanato-3,3,5-trimethyl-5-isocyanatomethyl cyclohexane (IPDI) and/or bis-(isocyanatocyclohexyl)-methane, particularly those based on 1,6-hexamethylene diisocyanate. Other suitable polyisocyanates based on these diisocyanates may include the biuret, urethane, uretdione and/or isocyanurate derivatives of these diisocyanates which, after their production, have been freed in the known manner, preferably by distillation, from excess starting diisocyanate to a residual content of less than 0.5 percent by weight. Aliphatic polyisocyanates for use in accordance with the invention include biuret polyisocyanates based on hexamethylene which are based on mixtures of N,N',N"-tris-(6-isocyanatohexyl)biuret with small quantities of its higher homologs. These polyisocyanates may be obtained by the processes according to U.S. Pat. Nos. 3,124,605; 3,358,010; 3,903,126; 3,903,127 or 3,976, 622. Also preferred are the cyclic trimers of 1,6-hexamethylene diisocyanate corresponding to the criteria mentioned above which may be obtained in accordance with U.S. Pat. No. 4,324,879 and which are based on N,N'N"-tris-(6-isocyanatohexyl)-isocyanurate in admixture with small quantities of its higher homologs.

The aromatic polyisocyanates which may also be used in accordance with the invention, but are less preferred, are based on 2,4-diisocyanatotoluene or commercial mixtures thereof with 2,6-diisocyanatotoluene or based on 4,4'-diisocyanatodiphenylmethane or mixtures thereof with its isomers and/or higher homologs. Aromatic polyisocyanates of this type include the urethane isocyanates obtained by the reaction of excess quantities of 2,4-diisocyanatotoluene with polyhydric alcohols such as trimethylolpropane and subsequent removal of the unreacted diisocyanate excess by distillation. Other aromatic polyisocyanates include the trimers of the previously mentioned monomeric diisocyanates which have also been freed from excess monomeric diisocyanates, preferably by distillation, after their production.

To prepare the ready-to-use coating compositions, polyisocyanate component (b) is emulsified in an aqueous dispersion of amino group-containing polymer component (a). The dissolved or dispersed polymer simultaneously serves as an emulsifier for the polyisocyanate added. Optionally, dispersing component (b) may be assisted by a separate surfactant. Mixing may be carried out by simple stirring at room temperature. The quantity of the polyisocyanate component is selected to provide an NCO:NH equivalent ratio {or NCO:(NH+OH) equivalent ratio if hydroxyl functionality is present}, based on the isocyanate groups of component (b) and the primary and secondary amino groups and hydroxyl groups of component (a), of less than 1:1, preferably at least 0.5:1. The ratio depends upon the particular isocyanate used.

For the purposes of the present invention, a primary amino group is considered as an equivalent of two, and a secondary amino group is considered an equivalent of one. Thus, NH in the ratios above represents equivalents of amine hydrogen.

Additives typically used in coating technology may be incorporated into the coating composition of the present invention. The additives include foam inhibitors, leveling aids, pigments, dispersion aids for pigments, etc., and are preferably introduced initially into component (a).

The coating compositions according to the invention thus obtained are suitable for virtually any applications where high performance is desired. They are particularly useful for coating of metal surfaces and various plastic surfaces.

The invention is further illustrated but is not intended to be limited by the following examples in which all parts and percentages are by weight unless otherwise specified.

EXAMPLE 1

The following initial charge and feeds were used in the preparation of aqueous secondary amine functional acrylic polymer via emulsion polymerization technique.

| Ingredients | Parts by Weight |
| --- | --- |
| Initial Charge | |
| Deionized water | 600.0 |
| ABEX EP-120[1] | 64.2 |
| Feed 1 | |
| n-Butyl acrylate | 300.8 |
| Methyl methacrylate | 179.2 |
| Tert-butylaminoethyl methacrylate | 160.0 |
| Feed 2 | |
| V-501[2] | 16.0 |
| Aqueous ammonia (29.7%) | 7.0 |
| Deionized water | 296.6 |

[1]Ammonium salt of sulfated nonylphenoxypoly(ethyleneoxy) ethanol (30% active), available from Rhone-Poulenc, USA.
[2]4,4'-Azobis(4-cyanovaleric acid), available from Wako Chemicals USA, Inc.

The initial charge was heated to a temperature of 80° C. with agitation in a reaction vessel suitable for aqueous emulsion polymerization. 40 grams of Feed 1 was added to the reaction vessel and held about 5 minutes for regaining the temperature, followed by the addition of 40 grams of Feed 2 and holding the reaction mixture temperature at 80° C. for 30 minutes. Then the temperature was raised to 85° C., and the reaction mixture was held for 30 minutes at this temperature. The remaining portions of Feed 1 and 2 were added to the reaction mixture simultaneously over a 3-hour period while maintaining the reaction mixture temperature at about 85° C. At the completion of the additions, the reaction mixture was held for 2 hours at 85° C. to complete the polymerization. The product was filtered to yield a dispersion with a resin content of 40.6 percent determined at 110° C. for one hour and a pH of 9.27.

EXAMPLE 2

Ref.: 95-187-032

The following initial charge and feeds were used in the preparation of aqueous secondary amine functional acrylic polymer via emulsion polymerization technique.

| Ingredients | Parts by Weight |
| --- | --- |
| Initial Charge | |
| Deionized water | 300.0 |
| ABEX EP-120 | 19.2 |
| Feed 1 | |
| n-Butyl acrylate | 96.0 |
| Methyl metacrylate | 160.0 |
| Tert-butylaminoethyl methacrylate | 64.0 |
| Feed 2 | |
| V-501 | 8.0 |
| Aqueous ammonia (29.7%) | 3.5 |
| Deionized water | 148.3 |

The initial charge was heated to a temperature of 85° C. with agitation in a reaction vessel suitable for aqueous emulsion polymerization. 25 grams of Feed 1 was added to the reaction vessel and held about 10 minutes for regaining the temperature, followed by the addition of 25 grams of Feed 2 and holding the reaction mixture temperature at 85° C. for 30 minutes. Then the remaining portions of Feed 1 and 2 were added to the reaction mixture simultaneously over a 3-hour period while maintaining the reaction mixture temperature at about 85° C. At the completion of the additions, the reaction mixture was held for 2 hours at 85° C. to complete the polymerization. The product was filtered to yield a dispersion with a resin content of 40.2 percent determined at 110° C. for one hour and a pH of 8.8.

EXAMPLE 3 (COMPARATIVE)

For the purpose of comparison, a secondary amine functional polymer was prepared in the same manner as disclosed in Example 5 of U.S. Pat. No. 5,225,505. In a reactor a mixture of 54 grams of methyl methacrylate, 50 grams of tert-butylaminoethyl methacrylate, 94 grams of n-buty 1 acrylate and 2 grams of acrylic acid was polymerized batchwise in an emulsion in 300 grams of deionized water in the presence of 0.7 grams of ammonium persulphate and 0.7 grams of sodium metabisulphite as initiators, and in the presence of 20 grams of ABEX EP-120 (30 percent active) as surfactant. The polymerization was carried out at 72° C. for about 3 hours, resulting in an unstable dispersion. An exotherm was observed after further addition of 0.7 grams of ammonium persulphate dissolved in 10 grams of deionized water and 0.7 grams of sodium metabisulphite dissolved in 10 grams of deionized water and raising the reaction temperature to 85° C. The reaction mixture was held about one hour at 85° C. The resultant dispersion was full of grit, and after filtration gave a dispersion having 31.4 percent solids determined at 110° C. for one hour. The product was undesirable for use in a coating composition because of its grit content.

The following Examples A, B, and C are coating compositions formulated with the anionic amino polymers of Examples 1 and 2. The pH of each of the compositions was greater than 7.0.

EXAMPLE A

| Ingredients | Parts by Weight |
|---|---|
| Grind Paste | |
| Deionized water | 8.330 |
| TANOL 850[3] | 0.500 |
| PGNP-15 Surfactant[4] | 0.574 |
| TRITON GR7M[5] | 0.260 |
| PLURONIC P-103[6] | 0.056 |
| DEE FO 97-3[7] | 0.121 |
| BUSAN 11-M1[8] | 2.120 |
| ZB-325[9] | 3.571 |
| NYAD 1250[10] | 1.228 |
| TI-PURE R-902-38[11] | 3.380 |
| BAYFERROX 3910[12] | 0.444 |
| BAYFERROX Black 318M[13] | 0.712 |
| MICROTALC MP-12-50[14] | 8.288 |
| BARIMITE XF[15] | 3.287 |
| ATTAGEL 50[16] | 0.223 |
| TEXANOL[17] | 0.245 |
| Deionized water | 4.457 |
| DSX-1514[18] thickener | 0.243 |
| Let-down | |
| n-Propanol[19] | 0.122 |
| Amino acrylate of Example 1 | 27.158 |
| EXXATE 900[20] | 2.732 |
| Isocyanate | |
| Anionic isocyanate[21] | 3.346 |
| EXXATE 900 | 0.549 |
| Deionized water | 28.504 |

EXAMPLE B

| Ingredients | Parts by Weight |
|---|---|
| Grind Paste | |
| Deionized water | 13.456 |
| TAMOL 850 | 0.527 |
| PGNP-15 SURFACTANT | 0.502 |
| Deionized water | 4.77 |
| TRITON GR-7M | 0.126 |
| PLURONIC P-103 | 0.110 |
| DEE FO 97-3 | 0.140 |
| MOLYWHITE 212[22] | 2.324 |
| ZB-325 | 1.163 |
| SICORIN RZ[23] | 0.079 |
| MICROTALC MP-12-50 | 13.764 |
| BARIMITE XF | 5.459 |
| TI-PURE R902-38 | 2.389 |
| BUFF TiO$_2$[24] | 1.183 |
| RAVEN 410[25] | 0.008 |
| BAYFERROX 140M[26] | 0.008 |
| BAYFERROX 3910 | 0.276 |
| BAYFERROX BLACK 318M | 0.440 |
| ATTAGEL 50 | 0.117 |
| TEXANOL | 0.279 |
| DSX-1514 thickener | 0.063 |
| Let-down | |

-continued

| Ingredients | Parts by Weight |
|---|---|
| n-Propanol | 0.031 |
| Sodium dichromate[27] | 0.210 |
| Amino acrylate of Example 2 | 35.322 |
| EXXATE 900 | 3.532 |
| Deionized water | 8.475 |
| SANTICIZER 160[28] | 1.048 |
| Isocyanate | |
| EMULSIFIER[29] | 0.766 |
| Isophorone diisocyanate[30] | 1.073 |
| Deionized water | 6.500 |

EXAMPLE C

| Ingredients | Parts by Weight |
|---|---|
| Grind Paste | |
| Deionized water | 7.021 |
| TAMOL 850 | 0.527 |
| PGNP-15 Surfactant | 0.669 |
| TRITON GR-7M | 0.421 |
| DEE FO 97-3 | 0.118 |
| RAVEN 410 | 0.156 |
| TI-PURE R902-38 | 1.872 |
| BUFF TIO2 | 7.489 |
| MICROTALC MP-12-50 | 10.648 |
| BARIMITE XF | 4.212 |
| SHIELDEX[31] | 4.088 |
| Deionized water | 9.819 |
| Sodium dicromate | 0.234 |
| Let-down | |
| Amino acrylate of Example 2 | 35.212 |
| EXXATE 900 | 4.808 |
| Deionized water | 8.449 |
| Isocyanate | |
| DESMODUR N 3400[32] | 3.049 |
| EMULSIFIER[33] | 0.829 |
| SILQUEST Y-9669[34] | 0.379 |

[3]Tamol 850 - Aqueous pigment dispersant available from Union Carbide Chemicals & Plastic Company, Industrial Chemicals Div., 39 Old Ridgeburg Rd., Danbury, Connecticut.
[4]PGNP-15 - Polyproxylated nonyl phenol, nonionic surfactant produced by PPG Industries, Pittsburg, Pennsylvania.
[5]Triton GR-7M - Anionic surfactant available form Union Carbide Chemicals & Plastic Company, Industrial Chemicals Div., Danbury, Connecticut.
[6]Pluronic P-103 - Nonionic surfactant available from BASF Corporation, Chemicals Div., Parsippany, New Jersey.
[7]DEE FO ® 97-3 - Defoamer available from Ultra Additives, Inc., Paterson, New Jersey.
[8]BUSAN 11-M1 - Barium metaborate available from Buckmen Laboratories, Inc., Memphis, Tennessee.
[9]ZB-235 - Zinc borate available from Polymer Additives Group, Southfield, Michigan.
[10]NYAD 1250 - Wollastonite available from Nyco Minerals Inc., Willsboro, New York.
[11]TI-PURE ® R902-38 - Titanium dioxide pigment available from E.I. du Pont de Nemours & Co., Wilmington, Delaware.
[12]BAYFERROX 3910 - Yellow iron oxide pigment available from Bayer Corporation, Pittsburg, Pennsylvania.
[13]BAYFERROX Black 318M - Black iron oxide pigment available from Bayer Corporation, Pittsburg, Pennsylvania.
[14]MICROTALC ® MP-12-50 - Magnesium silicate hydrate available from Whittaker, Clark, & Daniel Inc., South Plainfield, New Jersey.
[15]BARIMITE XF ® - Barium sulfate available form Cyprus Industrial Mineral Co., Cartersville, Georgia.
[16]ATTAGEL 50 - Attapulgite available from Engelhard Corporation, New Jersey.

[17] TEXANOL - Solvent available from Eastman Chemical Products, Inc., Kingsport, Tennessee.
[18] DSX-1514 ® - Thickener available from Henkel, Kankakee, Illinois.
[19] n-Propanol - Solvent available from Eastman Chemical Products, Inc., Kingsport, Tennessee.
[20] EXXATE ® 900 - $C_9$ alkyl acetate solvent available from Exxon Chemical Co., Houston, Texas.
[21] Anionic isocyanate made by the following reaction. Isophorone diisocyanate (318.2 grams, 2.88 NCO equivalents), DESMODUR W (188.6 grams, 1.44 NCO equivalents), and propoxylated 1,4-butanediol sodium sulfonate (244.7 grams, 1.03 OH equivalents) were placed into a one liter, four-neck, round bottom flask. The flask was heated to 90° C. and a nitrogen blanket was applied throughout the reaction. The flask was kept at 90° C. until the isocyanate equivalent weight reached 225. The propoxylated 1,4-butanediol sodium sulfonate was prepared in accordance with British Patent No. 1,447,612 by hydro-sulfonation of the product of the reaction of 1,4-butanediol (1 mole) with propylene oxide (6 moles).
[22] MOLYWHITE 212 - Corrosion protective pigment available from Sherwin Williams Chemicals, Coffeyville, Kansas.
[23] SICORIN RZ - Corrosion protective pigment available from BASF Corp., Rensselaer, New York.
[24] BUFF TiO2 - Hiding pigment available from Hitox Corporation of America, Corpus Chriti, Texas.
[25] RAVEN ® 410 - Carbon black pigment available from Cities Service Co., Columbian Div., Akron, Ohio.
[26] BAYFERROX 140M - Red iron oxide pigement available from Bayer Corporation, Pittsburg, Pennsylvania.
[27] Sodium dichromate - Flash rust inhibitor available from Fisher Scientific Co., Chemical Mfg. Div., Fair Lawn, New Jersey.
[28] SANTICIZER 160 - Butyl benzyl phthalate available from Monsanto, St. Louis, Missouri.
[29] Emulsifier - A nonionic surfactant containing 62.3% T-1890 (an IPDI isocyanurate from Huls America, Inc., Piscataway, NJ 08855), 28.8% CORBOWAX 750ME (a monofunctional polyether surfactant available from Union Carbide Chemicals & Plastics Co., Inc., S. Charleston, WV 25303), 16.9% diethylamine (secondary amine available from Union Carbide, S. Charleston, WV) prepared in methyl ethyl ketone and PROGLYDE DMM (solvent, dipropylene glycol dimethoxyether, available from Dow Chemical U.S.A., Chemicals and Performance Products Dept., 100 Larkin Ctr., Midland, MI 48674).
[30] Isophorone diisocycnate - Monomeric, aliphatic isocyanate available from Bayer Corporation, Pittsburg, PA.
[31] SHIELDEX - Corrosion protective pigment available from Grace, Davison Chemical Div., Baltimore, MD 21203.
[32] DESMODUR ® N 3400 - A trimer isocyanate available from Bayer Corporation, Pittsburg, Pennsylvania.
[33] Emulsifier - A nonionic surfactant containing 75% T-1890 (an IPDI isocyanaurate available from Huls America, Inc., Piscataway, NJ 08855) and 25% CARBOWAX ® 750ME (a monofunctional polyether surfactant available from Union Carbide Chemicals & Plastic Co., Inc., Solvents & Coatings Materials Div., S. Charleston, WV 25303), prepared in methyl ethyl ketone and PROGLYDE DMM (dipropylene glycol dimethoxy ether, available from Dow Chemical Co., Midland, MI).
[34] SILQUEST ® Y-9669 - Amino-silane available from OSi Specialties, Inc., Sistersville, West Virginia.

The coating compositions of Examples A through C were prepared in the following manner. In a grinding vessel under high speed agitation with a Cowles blade, the pigments were sifted into the other components of the grind paste (except the thickener). After stirring for 5 minutes the Cowles blade was replaced with an Impeller blade, and zircoa beads were then added. This mix was stirred at high speed for one hour, after which the beads were separated from the grind paste. The thickener (DSX-1514) was then added to the grind paste and stirred at high speed for five minutes, after which the grind paste was diluted with the let-down ingredients. The isocyanate portions of the Examples were prepared and added to the other ingredients as described below.

In Example A, the anionic isocyanate was diluted with EXXATE 900 to 70% solids, further diluted to 35% solids with deionized water, and then immediately stirred with moderate agitation into the container holding the remainder of the ingredients.

In Example B, 75% isophorone diisocyanate was blended with 25% of the isocyanate emulsifier. This combination was stirred with moderate agitation into the container holding the remainder of the ingredients.

In Example C, the isocyanate emulsifier was blended with SILQUEST Y-9669 at 1 part isocyanate to 1 part amine by equivalents. After a 24 hour induction, 25% of the blend was mixed with DESMODUR N 3400 isocyanate. This isocyanate combination was stirred with moderate agitation into the container holding the remainder of the ingredients.

Each of the coating formulations of Examples A, B, and C was tested for performance by application onto a substrate prepared as follows. The substrate for each example was 32 gauge, unpolished, cold rolled steel (available from Advanced Coating Technologies, Inc., Hillsdale, Mich., as code: APR10288) sanded with P180 grit sandpaper (P 180-216U, Production RN FRE-CUT, Paper A weight, open coat, available from 3M, St. Paul, Minn.). The substrate was washed with Acryli-Clean or DX-330 (available from PPG Industries, Pittsburgh, Pa. as a wax and grease remover) and wiped with a lintless tissue (available from Scott Paper Company, Philadelphia, Pa., as Scott Precision Wipes).

After at least a 24 hour induction each of the compositions of the examples was applied by air-atomized spray at 45 psi. over the previously prepared substrates. Each coated substrate was air-dried under ambient conditions for 1 hour. Then each was dry-sanded with P400 grit sandpaper (P400-213Q, Imperial Wetdry production paper, "A" weight, available from 3M, St. Paul, Minn.) immediately and, if necessary, at every succeeding hour interval. The time at which the example coating was observed to be sandable, i.e., when it did not foul the sandpaper, was taken to be the minimum required time after application until sandable.

Immediately after each spray application, the remaining portion of each example composition, approximately 85 to 100 grams, was sealed in a ½ pint container. Each sample container was stored at room temperature for two months, reopened, and observed for fluidity at one month intervals.

Evaluation of the adhesion of the coating of each example to the substrate was performed by applying masking tape (2 inch, "232 Masking Tape" available from 3M, St. Paul Minn.) after a 1 hour cure and dry time and then peeling it off. Additional adhesion testing was performed in accordance with method set forth in ASTM D3359, Method B, whereby the example coating was scribed with a Gardner Cross Cut Tester, Model P-A-T, fitted with a PA-2056 blade, both available from Gardco, Pompano Beach, Fla. The scribed coatings were subjected to tape pulling using Permacel 99 tape after the example coatings were dried and cured for 96 hours, and again after an additional 96 hours during which they were exposed to 100 degrees F. and 100% humidity.

The results of each of these performance tests are set forth in Table 1.

TABLE 1

|  | EXAMPLE A | EXAMPLE B | EXAMPLE C |
|---|---|---|---|
| SANDING |  |  |  |
| 1 hr. | Pass | Fail | Pass |
| 2 hr. | N.A. | Pass | N.A. |
| 3 hr. | N.A. | N.A. | N.A. |
| ADHESION |  |  |  |
| 1 hr masking | Pass | Pass | Pass |
| 96 hr. | Pass, 100% | Pass, 100% | Pass, 99% |
| 96 hr. plus 96 hr. humidity exposure | Pass, 100% | Pass, 95% | Fail, 90% |
| FLUIDITY |  |  |  |
| 1 month | Pass | Pass | Pass |
| 2 month | Pass | Pass | Pass |

N.A., or "not applicable," indicated no further testing was needed.
A "fail" rating under SANDING indicated fouling of the sandpaper due to embedment of the coating into the sandpaper's grit.
A "fail" rating under ADHESION indicated a less than 95% adhesion of the example coating over the substrate.
A "fail" rating under FLUIDITY indicated an example coating with an unsprayable viscosity, even when diluted with water.

The following examples illustrate embodiments of the invention wherein the coating composition is supplied as two separate packages for the amino polymer and the polyisocyanate. Examples 4 and 5 relate to amino polymers employed in the coating formulations of Examples D and E.

EXAMPLE 4

The following initial charge and feeds were used in the preparation of aqueous secondary amine functional acrylic polymer via emulsion polymerization technique.

| Ingredients | Parts by Weight |
|---|---|
| Initial Charge |  |
| Deionized water | 600.0 |
| ETHOMEEN C/25* | 19.2 |
| Feed 1 |  |
| n-Butyl acrylate | 300.8 |
| Methyl methacrylate | 179.2 |
| Tert-butylaminoethyl methacrylate | 160.0 |
| Feed 2 |  |
| V-501 initiator | 16.0 |
| Aqueous ammonia (29.7%) | 7.0 |
| Deionized water | 296.6 |

*Polyoxyethylene(15)cocoamine, available from Akzo Chemie America.

The initial charge was heated to a temperature of 80° C. with agitation in a reaction vessel suitable for aqueous emulsion polymerization. 40 grams of Feed 1 was added to the reaction vessel and held about 5 minutes for regaining the temperature, followed by the addition of 40 grams of Feed 2 and holding the reaction mixture temperature at 80° C. for 30 minutes. Then the temperature was raised to 85° C., and the reaction mixture was held 30 minutes at this temperature. The remaining portions of Feed 1 and 2 were added to the reaction mixture simultaneously over a 3-hour period while maintaining the reaction mixture temperature at about 85° C. At the completion of addition the reaction mixture was held for 2 hours at 85° C. to complete the polymerization. The product was filtered to yield a dispersion with a resin content of 41.5 percent determined at 110° C. for one hour and a pH of 9.33.

EXAMPLE 5

The following initial charge and feeds were used in the preparation of aqueous secondary amine functional acrylic polymer via emulsion polymerization technique.

| Ingredients | Parts by Weight |
|---|---|
| Initial Charge |  |
| Deionized water | 300.0 |
| ABEX EP-120 | 19.2 |
| Feed 1 |  |
| n-Butyl acrylate | 96.0 |
| Methyl methacrylate | 160.0 |
| Tert-butylaminoethyl methacrylate | 64.0 |
| Feed 2 |  |
| V-501 initiator | 8.0 |
| Aqueous ammonia (29.7%) | 3.5 |
| Deionized water | 148.3 |

The initial charge was heated to a temperature of 85° C. with agitation in a reaction vessel suitable for aqueous emulsion polymerization. 25 grams of Feed 1 was added to the reaction vessel and held about 10 minutes for regaining the temperature, followed by the addition of 25 grams of Feed 2 and holding the reaction mixture temperature at 85° C. for 30 minutes. Then the remaining portions of Feed 1 and 2 were added to the reaction mixture simultaneously over a 3-hour period while maintaining the reaction mixture temperature at about 85° C. At the completion of addition the reaction mixture was held for 2 hours at 85° C. to complete the polymerization. The product was filtered to yield a dispersion with a resin content of 40.2 percent determined at 110° C. for one hour and a pH of 8.8.

EXAMPLE D

| Ingredients | Parts by Weight |
|---|---|
| Package 1 |  |
| Deionized water | 13.048 |
| TAMOL 850 | 0.605 |
| PGNP-15 Surfactant | 0.166 |
| SOLSPERSE 27000[35] | 0.451 |
| TRITON GR-7M | 0.309 |
| DEE FO 97-3 | 0.077 |
| NALZIN 2[36] | 7.064 |
| NYAD 1250 | 3.531 |
| MICROTALC MP-12-50 | 10.008 |
| BARIMITE XF | 3.959 |
| TI-PURE R902-38 | 4.179 |
| BAYFERROX 3910 | 0.550 |
| BAYFERROX BLACK 318M | 0.880 |
| TEXANOL | 0.165 |
| DSX-1514 | 0.066 |
| n-Propanol | 0.033 |
| Sodium dichromate | 0.103 |
| Amino acrylate of Example 4 | 29.665 |
| EXXATE 900 | 4.121 |
| Deionized water | 16.600 |
| Package 2 |  |
| EMULSIFIER[37] | 1.105 |
| DESMODUR N 3400 | 3.315 |

EXAMPLE E

| Ingredients | Parts by Weight |
|---|---|
| Package 1 | |
| Deionized water | 6.003 |
| TAMOL 850 | 0.450 |
| PGNP-15 Surfactant | 0.572 |
| TRITON GR-7M | 0.360 |
| DEE FO 97-3 | 0.100 |
| SHIELDEX | 3.362 |
| MICROTALC MP-12-50 | 9.104 |
| BARIMITE XF | 3.602 |
| TI-PURE R902-38 | 1.601 |
| BUFF $TiO_2$ | 6.403 |
| RAVEN 410 | 0.133 |
| Strontium chromate[38] | 0.300 |
| Deionized water | 8.028 |
| DSX-1514 thickener | 0.200 |
| n-Propanol | 0.100 |
| Amino acrylate of Example 5 | 30.105 |
| EXXATE 900 | 5.002 |
| Deionized water | 21.094 |
| Package 2 | |
| Emulsifier[37] | 0.870 |
| DESMODUR N 3400 | 2.611 |

[35]SOLSPERSE ® 27000 - Hyperdispersant available from ICI Surfactants, Wilmington, Delaware.
[36]NALZIN ® 2 - Anticorrosive pigment available from Rheox, Inc., P.O. Box 700, Highstown, NJ.
[37]Emulsifier - A nonionic surfactant containing 33.3% T-1890 (an IPDI isocyanurate available from Huls America, Piscataway, NJ 08855.), 11.1% CARBOWAX ® 750ME, 55.6% Solvactant ® DMH-7 (a monofunctional polyether surfactant and a nonionic surfactant, respectively, both available from Union Carbide Chemicals and Plastics Co., Inc., Danbury, Connecticut.
[38]Strontium chromate - Corrosion inhibitive pigment available from Cookson Pigments.

The coating compositions of Examples A and B were prepared as two-package compositions with the amino acrylate, pigments, and additives in one package (Package 1) and the isocyanate and isocyanate emulsifier in a second package (Package 2). In an appropriate grinding vessel and under high speed agitation with a Cowles blade, Package 1 was prepared by mixing the pigments into a surfactant, defoamer, and water mix. After stirring for 5 minutes the Cowles blade was replaced with an Impeller blade, and zircoa beads were then added. This mix was stirred at high speed for one hour, after which the beads were separated from the grind paste. The thickener (DSX-1514) was added to the grind paste and stirred at high speed for five minutes. An appropriate amount of this grind paste was then added to the amino acrylate and water.

Each of the coating formulations of Examples D and E was tested for performance by application onto a substrate prepared in the same manner as described above in connection with Examples A, B, and C.

Before spray application, Package 2 was added to Package 1 for each example, with moderate and constant agitation. Each of the compositions of the examples was applied by air-atomized spray at 45 psi. over the previously prepared substrates. Each coated substrate was air-dried under ambient conditions for 1 hour. Then each was dry-sanded with P400 grit sandpaper (P400-213Q, Imperial Wetordry production paper, "A" weight, available form 3M, St. Paul, Minn.) immediately and, if necessary, at every succeeding hour interval. The time at which the example coating was observed to be sandable, i.e., when it did not foul the sandpaper, was taken to be the minimum required time after application until sandable.

Each two-component coating composition example was additionally subjected to a test for gassing potential. Immediately after each spray application, the remaining portion of each blended composition, approximately 85 to 100 grams, was sealed in a ½ pint container. Each sample container was opened at 1 hour intervals and was evaluated for gas-pressure buildup by listening for an audible hissing of pressurized gas, an audible popping of the lid, or observing bubbling or foaming of the wet sample.

Evaluation of adhesion of each coating to the substrate was performed by the same technique described above in connection with Examples A, B, and C.

The results of each of these performance tests for Examples D and E are set forth in Table 2.

TABLE 2

| | EXAMPLE D | EXAMPLE E |
|---|---|---|
| SANDING | | |
| 1 hr. | Fail | Pass |
| 2 hr. | Pass | N.A. |
| 3 hr. | N.A. | N.A. |
| ADHESION | | |
| 1 hr. masking | Pass, 100% | Pass, 100% |
| 96 hr. | Pass, 100% | Pass, 100% |
| 96 hr. plus 96 hr. humidity exposure | Pass, 100% | Pass, 100% |
| GASSING | | |
| 1 hr. | Pass | Pass |
| 2 hr. | Pass | Pass |
| 24 hr. | Pass | Pass |

N.A., or "not applicable," indicated no further testing was needed.
A "fail" rating under SANDING indicated fouling of the sandpaper due to embedment of the coating into the sandpaper's grit.
A "fail" rating under ADHESION indicated a less than 95% adhesion of the example coating over the substrate.
A "fail" rating under GASSING indicated bubbling of the wet sample due to gas evolvement.

Although the invention has been described in detail for the purpose of illustrating the best mode of the invention, it is to be understood that such detail is solely for that purpose and that variations can be made by those skilled in the art without departing from the spirit and scope of the invention as defined by the claims.

What is claimed is:

1. An aqueous coating composition having pH above 7.0 having a binder comprising polyureas formed by the combination of:
   (a) an anionic amino polymer synthesized in water from olefinically unsaturated compounds containing isocyanate-reactive groups selected from the group consisting of primary amino groups, secondary amino groups, or combinations thereof, said olefinically unsaturated compounds being substantially free of acid groups, said polymerization carried out in the presence of an azo initiator dispersed in water by neutralization of acid groups present on the initiator; and
   (b) a polyisocyanate.

2. The coating composition of claim 1 wherein the polyisocyanate is in combination with a nonionic surfactant.

3. The coating composition of claim 1 wherein the polyisocyanate and amino polymer are proportioned to each other in an NCO/NH equivalent ratio of 0.5:1 to 5:1.

4. The coating composition of claim 1 wherein the NCO/NH equivalent ratio is less than 1:1.

5. The coating composition of claim 1 wherein components (a) and (b) are provided in separate packages.

6. The coating composition of claim 1 wherein components (a) and (b) are provided in admixture in a single package.

7. The coating composition of claim 6 wherein said polyisocyanate has an average functionality of no more than two isocyanate groups per molecule.

8. The coating composition of claim 6 wherein the polyisocyanate and amino polymer are proportioned to each other in an NCO/NH equivalent ratio less than 1:1.

9. The coating composition of claim 1 wherein the amino polymer is an acrylic polymer.

10. The coating composition of claim 1 wherein the amino polymer is a polyacrylate substantially free of hydroxyl functionality.

11. The coating composition of claim 9 wherein the amino group content of the polyacrylate of component (a) is 0.05 to 2.70 milliequivalents per gram.

12. The coating composition of claim 9 wherein the amino group content of the amino polymer is 0.25 to 1.62 milliequivalents per gram.

13. The coating composition of claim 1 wherein the amino polymer is the reaction product of monomers of which 1 to 50 percent by weight are amino group containing monomers.

14. The coating composition of claim 1 wherein the amino polymer is the reaction product of monomers of which 5 to 30 percent by weight are amino group containing monomers.

15. The coating composition of claim 1 wherein the functionality of the polyisocyanate has been reduced from higher than two isocyanate groups per molecule prior to mixing with the amino polymer.

* * * * *